J. RICHARDS.
Gaining Machines.
No. 143,531. Patented Oct. 7, 1873.
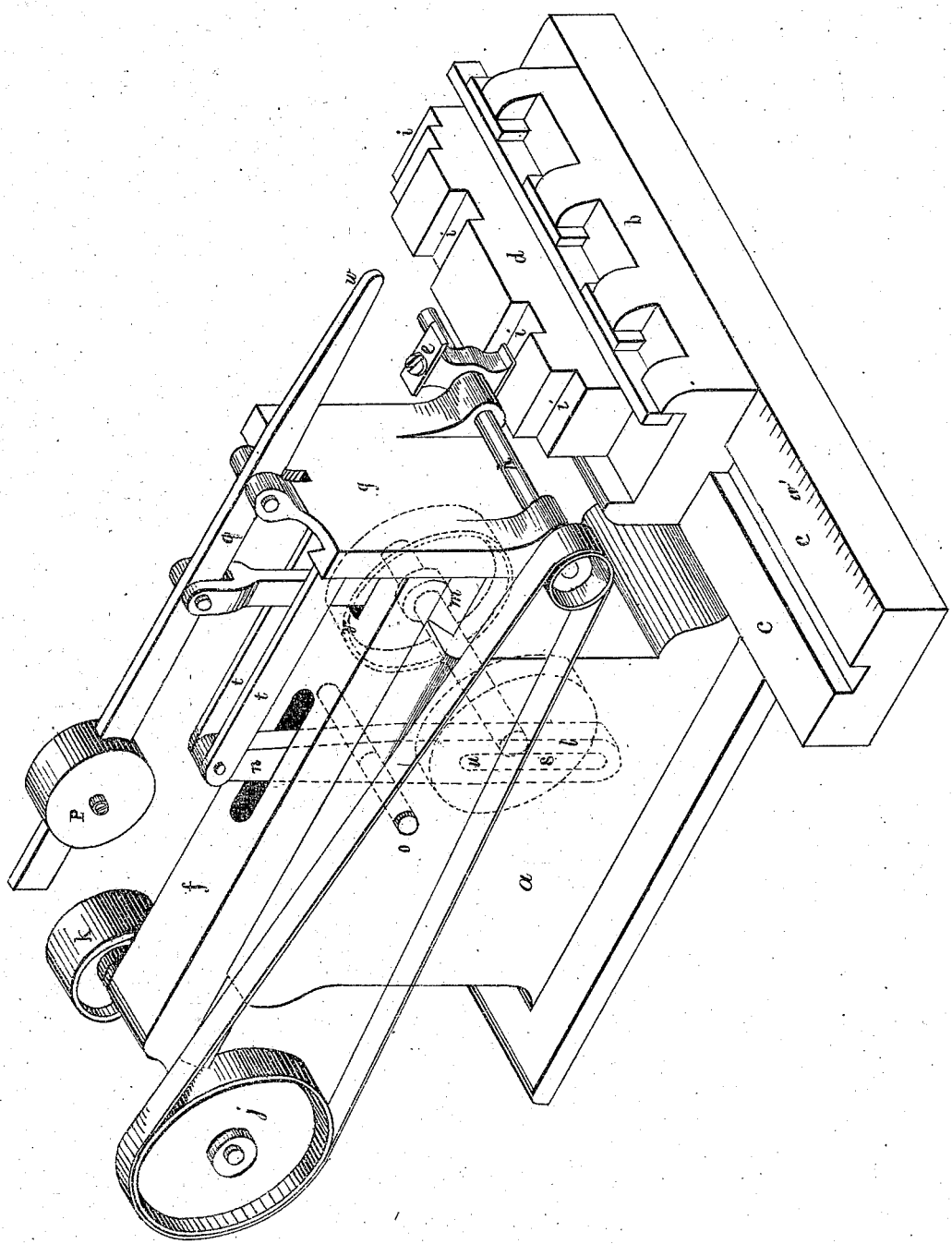
Attest
Jno D Patten
Alonzo Hughes
Inventor
John Richards

UNITED STATES PATENT OFFICE.

JOHN RICHARDS, OF PHILADELPHIA, PENNSYLVANIA.

IMPROVEMENT IN GAINING-MACHINES.

Specification forming part of Letters Patent No. 143,531, dated October 7, 1873; application filed September 24, 1873.

*To all whom it may concern:*

Be it known that I, JOHN RICHARDS, of the city and county of Philadelphia and State of Pennsylvania, have invented a new and useful Improvement in Gaining-Machines for Cutting Notches, Gains, or Rabbets in Wood-Work; and I declare the following to be a specification of the same.

The nature of this invention consists in a machine for cutting notches, gains, or rabbets in wood-work, the cutters that displace the wood having a rotary and a reciprocating movement combined, so that no adjustment of the material to be acted upon is needed, except in one direction, all other adjustments being given to the cutter-spindle and the cutter-head. It further consists in a reciprocating cutter-bar, carrying the tools that act upon the wood, the bar having a differential or varying speed of movement in its reciprocating motion, so that the cutting-tools may act at an approximately regular rate during the cutting, and then be rapidly withdrawn, to save time and facilitate operating of the machine. The practical objects of the invention are, to facilitate the cutting of notches, gains, or rabbets in wood manufactures; to save, in most cases, the time and expense required to mark and lay out such notches, gains, or rabbets; and to secure greater accuracy in their dimensions and their position on the pieces of timber in which they are formed than has been attained in the means hitherto employed for this purpose.

I will next describe the manner of constructing and operating this invention, referring to the accompanying drawing, which is an isometrical elevation representing a machine embodying the essential elements of my invention.

*a* is the main frame of the machine, made, by preference, with a hollow box-section, so as to secure thereby rigidity and strength, and also to protect such parts of the operating mechanism as are placed within the frame. *b* is a sliding table or carriage, upon which, *d*, the piece to be operated upon is placed, and cramped by means of wooden keys, in the manner shown, or by screws or other devices, as the nature of the work may require. This carriage or table *b* slides upon the guides *c c*, and may be moved by any suitable mechanism that the nature of the work may require; for the heaviest kinds of pieces, and when accurate spacing is required, a screw may be used. In ordinary cases a rack and pinion with a crank or hand-wheel is a convenient plan of feeding the carriage, while in the lighter kinds of work the movements and adjustments may be done with the hands alone. As this carriage *b* is moved along, either mechanical stops or marks and spaces, as at *w'*, are provided, so that the piece *d* may be acted upon at proper intervals, and gains and notches, as shown at *i i i i*, formed on its upper side by the rotary cutters at *e*. *f* is a strong reciprocating bar, carrying at its front end the saddle or slide *g*, in which is formed bearings to support the cutter-spindle *h*. On the other end of this bar *f* is carried the driving-shaft, furnished with a pulley, *j*, to drive the cutter-spindle *h*, and a pulley, *k*, by which the driving power is communicated to the cutting mechanism of the machine. This bar *f* slides freely on the top of the main frame *a*, in the guides seen at *m*, and has motion given to it by the pivoted lever *n*, the crank-wheel seen in dotted lines at *l*, and the pulley *v*, which may be driven from the same shaft that furnishes power to the pulley *k*. The vibrating lever *n* is pivoted on the cross-shaft at *o*, and has at its bottom end a slot, *s*, in which the crank-pin *u* works, producing a vibrating motion of the lever *n*, and a reciprocating movement of the bar *f*, the two being connected by the links *t t*. As the crank-pin, during its movement, is at varying distances from the fulcrum at *o*, it follows that the movement of the lever *n* and of the bar *f* is slow or accelerated as the crank-pin *u* approaches to or is removed from the pivot-center at *o*, producing a slow and approximately regular movement of the bar *f* in one direction, and a quick abrupt movement in the other direction, so that the feeding movement of the cutters *e* will be slow and regular on the forward or cutting stroke, and then be rapidly withdrawn on the back or return stroke. This movement of the cutter-bar *f* may be explained as the same that is commonly employed in metal-cutting machines that have reciprocating movement, and may be produced by various combinations of mechanism, as is well understood by those skilled in the construction of machines. The saddle *g* moves freely up or down upon guides attached to the bar $f$, and is counterbalanced by the weight P and the lever $q$. The lever extending out over the front of the machine forms a handle at $w$, by means of which the operator raises or lowers the saddle $g$ and the cutters $e$ at will, to clear the wood $d$ at the back stroke, and to cut at various depths on the forward stroke, as the nature of the work may require, the whole being controlled at will.

The depth to which the cutters $e$ may act, if uniform, needs only a permanent mechanical stop, that may be adjusted at the beginning for any piece of work; but when the notches or gains $i\ i\ i\ i$ require to be of various depths, different stops, gages, or a figured scale will be required to indicate the position of the saddle $g$ at the forward or cutting stroke. As such stops or gages are well known, admit of various modifications, and often require to be arranged to suit the special character of the work, they are omitted from the drawing as a thing which any mechanic can supply, when the requirements of the work to be performed are once determined.

As before explained, the movement of the carriage $b$ is also regulated by scales or by mechanical stops, so that no laying out or marking is needed, except for the first of a series of pieces that are to be cut in the same form.

Having thus described the nature of my invention and the manner of constructing the same, I do not claim a machine for cutting gains, notches, or rabbets wherein the lumber is moved to receive the action of the cutters, nor wherein the axes of the cutters are fixed relative to the frame of the machine.

I claim—

A wood-working machine to form notches, gains, and rabbets, organized and operating substantially in the manner and for the purposes hereinbefore specified.

JOHN RICHARDS.

Witnesses:
JNO. D. PATTEN,
ALONZO HUGHES.